United States Patent
Pan

(10) Patent No.: US 8,037,914 B2
(45) Date of Patent: *Oct. 18, 2011

(54) LAMINATING APPARATUS

(75) Inventor: Yung-Tai Pan, Taipei (TW)

(73) Assignee: Primax Electronics Ltd., Taipei (TW)

( * ) Notice: Subject to any disclaimer, the term of this patent is extended or adjusted under 35 U.S.C. 154(b) by 197 days.

This patent is subject to a terminal disclaimer.

(21) Appl. No.: 12/271,316

(22) Filed: Nov. 14, 2008

(65) Prior Publication Data

US 2010/0059184 A1    Mar. 11, 2010

(30) Foreign Application Priority Data

Sep. 5, 2008    (TW) ................. 97134180 A

(51) Int. Cl.
*G05G 15/02*    (2006.01)

(52) U.S. Cl. .......... 156/350; 156/64; 156/351; 156/359; 156/360; 156/362; 156/363; 156/364; 156/367; 156/368; 156/378; 156/379; 156/583.1; 74/505

(58) Field of Classification Search ............ 156/64, 156/350, 351, 359, 360, 362, 363, 364, 367, 156/368, 378, 379, 583.1; 74/505
See application file for complete search history.

(56) References Cited

U.S. PATENT DOCUMENTS

| | | | | |
|---|---|---|---|---|
| 516,399 A | * | 3/1894 | Ueda et al. | 460/54 |
| 2,171,129 A | * | 8/1939 | Mahnken | 116/262 |
| 2009/0032629 A1 | * | 2/2009 | Aries et al. | 241/236 |

* cited by examiner

*Primary Examiner* — Katarzyna Wyrozebski Lee
*Assistant Examiner* — Joshel Rivera
(74) *Attorney, Agent, or Firm* — Kirton & McConkie; Evan R. Witt

(57) ABSTRACT

A laminating apparatus having a thickness-detecting function is provided. Before the laminating operation is done, the thickness of the article to be laminated is detected by a thickness detecting mechanism of the laminating apparatus. According to the detected thickness, the temperature or the rotating speed of the heating roller of the laminating apparatus is dynamically adjusted.

6 Claims, 2 Drawing Sheets

LAMINATING APPARATUS

FIELD OF THE INVENTION

The present invention relates to a laminating apparatus, and more particularly to a laminating apparatus having a thickness-detecting function.

BACKGROUND OF THE INVENTION

Conventionally, a valuable sheet-like document such as a paper sheet or a photograph is usually covered with a protective film for protection because such a sheet-like document is readily suffered from damage or breakage.

A process for laminating a sheet-like document between two pieces of plastic films by using a laminating apparatus will be described as follows. First of all, an article of a sheet-like document intervening between two plastic films is fed into the laminating apparatus by a pair of heating rollers. Then, the article is simultaneously heated and pressed by the heating rollers and thus the plastic films are softened. Afterwards, the sheet-like document is bonded with the softened plastic films to form a laminate structure.

The conventional laminating apparatus, however, lacks a thickness detecting mechanism. Regardless of the thickness of the article to be laminated, the working temperature and the rotating speed of the heating rollers are maintained constant. In a case that the sheet-like document is too thick or too thin, the laminating operation is readily suffered from failure. Generally, as the thickness of the sheet-like document is increased, an increased working temperature or a decreased rotating speed is required to soften the plastic films. If the working temperature of the heating rollers is insufficient or the rotating speed of the heating rollers is too fast, the plastic films are not completely softened and thus the sheet-like document fails to be bonded with the plastic films to form a laminate structure. On the other hand, as the thickness of the sheet-like document is reduced, a decreased working temperature or an increased rotating speed is required to soften the plastic films. If the working temperature of the heating rollers is too high or the rotating speed of the heating rollers is too slow, the plastic films are over-softened and thus readily adhered to the heating rollers. Under this circumstance, a so-called jamming phenomenon is resulted.

Therefore, there is a need of providing a laminating apparatus having a thickness detecting mechanism for detecting the thickness of the article to be laminated so as to dynamically adjust the working temperature or the rotating speed of the heating rollers of the laminating apparatus.

SUMMARY OF THE INVENTION

The present invention provides a laminating apparatus having a thickness detecting mechanism for detecting the thickness of the article to be laminated. According to the detected thickness, the working temperature or the rotating speed of the heating rollers of the laminating apparatus is dynamically adjusted so that the laminating operation is smoothly performed.

In accordance with an aspect of the present invention, there is provided a laminating apparatus for laminating an article. The laminating apparatus includes an entrance channel and a thickness detecting mechanism. The thickness detecting mechanism is used for detecting a thickness of the article entering the entrance channel. The thickness detecting mechanism includes a retractable probe member, a retractable encoding disc member, a cable and a sensing element. The retractable probe member is partially embedded into the entrance channel. A position shift is resulted from the thickness of the article when the retractable probe member is pressed by the article. The retractable encoding disc member includes an encoding disc, a rotating shaft and an elastic element. The rotating shaft is connected to the encoding disc and aligned with a center rotating axle line of the encoding disc. The elastic element is connected to the rotating shaft. The cable is connected to the retractable probe member and wound around the rotating shaft. The position shift of the retractable probe member renders rotation of the retractable encoding disc member through the cable. The sensing element is disposed beside the encoding disc for detecting a rotation amount of the encoding disc. The thickness of the article is calculated according to the rotation amount detected by the sensing element.

In an embodiment, the elastic element is coil spring connected to the rotating shaft. An elastic energy is stored in the elastic element when the rotating shaft is rotated in a first direction. The rotating shaft is driven to rotate in a second direction opposite to the first direction when the elastic energy is converted into a kinetic energy.

In an embodiment, the elastic element is coil spring connected to the rotating shaft for maintaining sufficient tension of the cable.

In an embodiment, the thickness detecting mechanism further comprises a pulley between the retractable probe member and the rotating shaft for changing the direction of the cable.

Preferably, the sensing element is a photo interrupter.

In an embodiment, the retractable probe member comprises a probe and a spring. An elastic energy is stored in the spring when the probe is pressed by the article and moved in a first direction. The elastic energy in the spring is converted into a kinetic energy to drive movement of the probe in a second direction opposite to the first direction after the article is transported across the probe.

In an embodiment, the thickness detecting mechanism further comprises a fastening element. The cable is firstly wound around the rotating shaft, then wound around the fastening element and finally fixed on the rotating shaft.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the prior art, the present invention provides a laminating apparatus having a thickness detecting mechanism. According to the detected thickness, the working temperature or the rotating speed of the heating rollers of the laminating apparatus is dynamically adjusted.

Figure 1A:
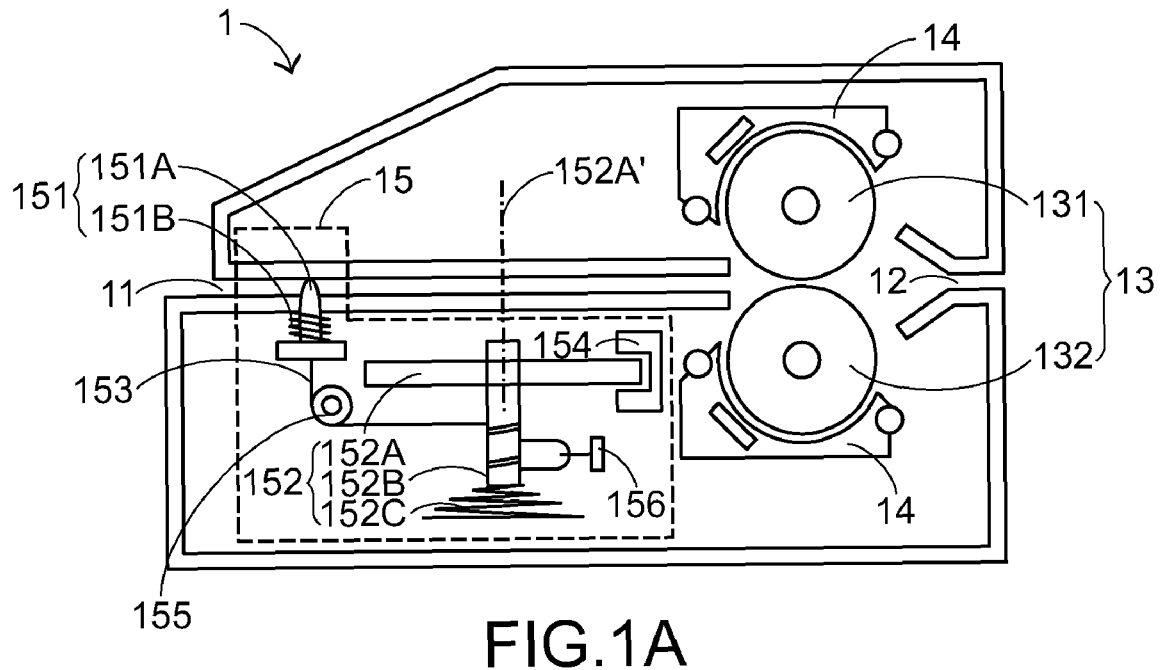
FIG. 1A is a schematic cross-sectional view illustrating a laminating apparatus having a thickness-detecting function according to a preferred embodiment of the present invention.
Figure 1B:
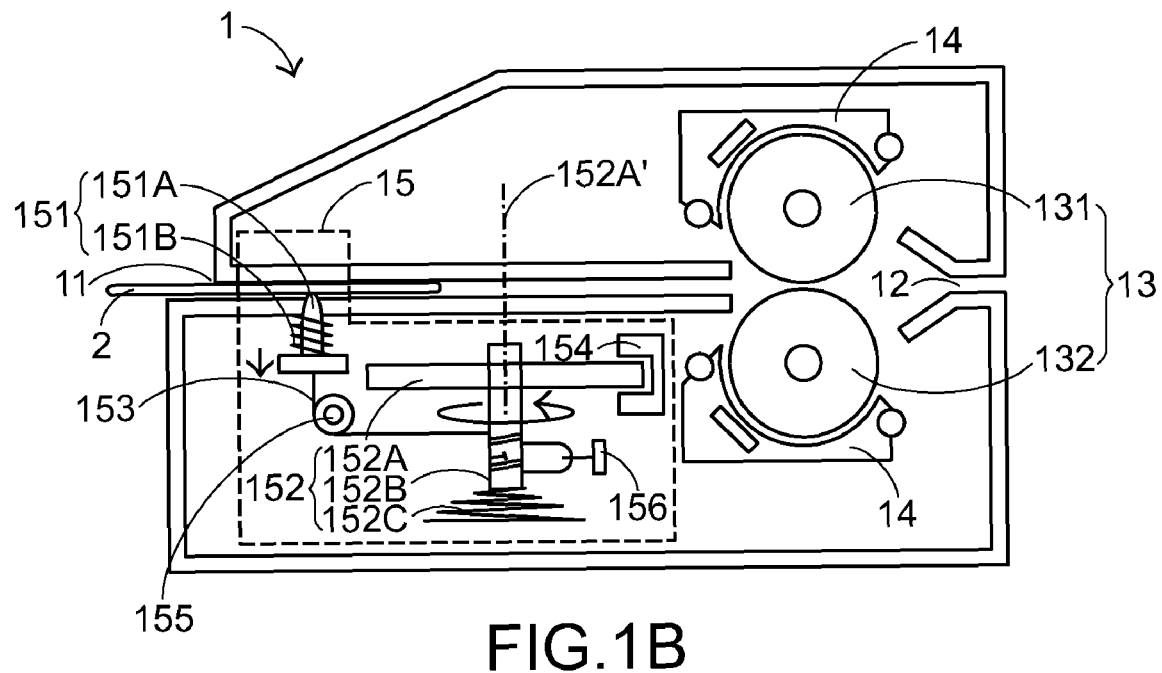
FIG. 1B is a schematic cross-sectional view illustrating operations of the thickness detecting mechanism of the laminating apparatus of the present invention.

FIG. 1A is a schematic cross-sectional view illustrating a laminating apparatus with a thickness-detecting function according to a preferred embodiment of the present invention. FIG. 1B is a schematic cross-sectional view illustrating operations of the thickness detecting mechanism of the laminating apparatus of the present invention. As shown in FIGS. 1A and 1B, the laminating apparatus 1 principally includes an entrance channel 11, an exit channel 12, a heating roller assembly 13, a heating unit 14 and a thickness detecting mechanism 15.

Hereinafter, a process for laminating a sheet-like document between two pieces of plastic films by using the laminating apparatus of the present invention will be illustrated with reference to FIGS. 1A and 1B. First of all, an article 2 of a sheet-like document intervening between two plastic films is inserted into the entrance channel 11. The heating roller assembly 13 includes a pair of adjacent heating rollers 131 and 132, which are arranged between the entrance channel 11 and the exit channel 12 for heating and pressing the article 2. After the laminating apparatus 1 is turned on to perform the laminating operation, the heat generated by the heating unit 14 will be transmitted to the heating rollers 131 and 132. The article 2 fed into the entrance channel 11 is transported and thermally pressed by the heating rollers 131 and 132 so that the sheet-like document is bonded with the plastic films to form a laminate structure. The laminate structure is then ejected out of the laminating apparatus 1 through the exit channel 12.

Please refer to FIGS. 1A and 1B again. The thickness detecting mechanism 15 of the laminating apparatus 1 can be used to detect the thickness of the article 2. According to the detected thickness, the working temperature or the rotating speed of the heating rollers 131 and 132 of the laminating apparatus 1 is dynamically adjusted. The thickness detecting mechanism 15 principally comprises a retractable probe member 151, a retractable encoding disc member 152, a cable 153 and a sensing element 154.

The retractable probe member 151 includes a probe 151A and a spring 151B. The probe 151A is partially embedded into the entrance channel 11. When the article 2 is fed into the entrance channel 11, the probe 151A is pressed by the article 2 to result in a position shift in a downward direction (as shown in FIG. 1B). In response to the position shift, an elastic energy is stored in the spring 151B. After the article 2 is transported across the probe 151A, the elastic energy in the spring 151B is converted into a kinetic energy. Due to the kinetic energy, the probe 151A is moved in the opposite direction (i.e. an upward direction) and thus returns to its original direction.

Please refer to FIGS. 1A and 1B again. The retractable encoding disc member 152 comprises an encoding disc 152A, a rotating shaft 152B and an elastic element 152C. The rotating shaft 152B is connected to the encoding disc 152A and aligned with the center rotating axle line 152A'. The elastic element 152C is also connected to the rotating shaft 152B. In this embodiment, the encoding disc 152A is an optical encoder. The encoding disc 152A has a grating having opaque portions and transparent portions alternately arranged on the rim thereof. The sensing element 154 is disposed beside the encoding disc 152A. An example of the sensing element 154 is a photo interrupter. The straight line connected between an emitter and a receiver of the photo interrupter 154 is perpendicular to the rim of the encoding disc 152A. When the encoding disc 152A is rotated with respect to a center rotating axle line 152A', the photo interrupter 154 generates a pulse signal with alternate high and low levels. According to the wave number and the frequency of the pulse signal, the rotation amounts of the encoding disc 152A (e.g. the optical encoder) are calculated. It is noted that, however, those skilled in the art will readily observe that numerous modifications and alterations may be made while retaining the teachings of the invention. For example, in other embodiments, the encoding disc 152A of the laminating apparatus 1 can be a magnetic encoding disc or an electromagnetic encoding disc. The type of the sensing element 154 is varied according to the encoding disc 152A. In addition to the complete circular shape, the shape of the encoding disc 152A can be varied as required. For example, the encoding disc 152A may have a fan-shape or an arbitrary shape as long as the encoding disc 152A is rotated with respect to the center rotating axle line 152A' and the rotation amounts of the encoding disc 152A is detectable by the sensing element 154. An exemplary elastic element 152C of the retractable encoding disc member 152 is a coil spring, which is connected to the rotating shaft 152B. When the rotating shaft 152B is rotated in a direction (e.g. a clockwise direction), an elastic energy is stored in the elastic element 152C. Whereas, when the elastic energy in the elastic element 152C is converted into a kinetic energy, the rotating shaft 152B is rotated in an opposite direction (e.g. an anti-clockwise direction) and thus returns to its original direction.

Please refer to FIGS. 1A and 1B again. In the thickness detecting mechanism 15 of the laminating apparatus 1, one terminal of the cable 153 is coupled to the retractable probe member 151 and the other terminal of the cable 153 is partially wound around the rotating shaft 152B of the retractable encoding disc member 152. When the article 2 is inserted into the entrance channel 11, as shown in FIG. 1B, the retractable probe member 151 is pressed by the article 2 to result in a position shift. Through the cable 153, the position shift of the retractable probe member 151 renders rotation of the retractable encoding disc member 152. Next, the sensing element 154 beside the encoding disc 152A measures the rotation amount of the encoding disc 152A. According to the rotation amount of the encoding disc 152A, the thickness of the article 2 is calculated.

According to the thickness of the article 2 entering the entrance channel 11 and detected by the thickness detecting mechanism 15, the working temperatures or the rotating speeds of the heating rollers 131 and 132 of the laminating apparatus 1 are dynamically adjusted. If the thickness of the article 2 lies within a preset range, the heating rollers 131 and 132 of the laminating apparatus 1 are operated at the normal working temperature or the normal rotating speed. If the thickness of the article 2 exceeds the upper limit of the preset range, the heating rollers 131 and 132 of the laminating apparatus 1 are operated at an increase working temperature or/and a reduced rotating speed in order to soften the plastic films and bond the sheet-like document with the plastic films. Whereas, if the thickness of the article 2 is below the lower limit of the preset range, the heating rollers 131 and 132 of the laminating apparatus 1 are operated at an increase working temperature or/and a reduced rotating speed or simultaneously increase working temperature/reduced rotating speed in order to prevent the jamming phenomenon.

Please refer to FIG. 1A again. The encoding disc 152A of the laminating apparatus 1 is parallel to the horizon or slightly tilted. The laminating apparatus 1 needs at least one pulley 155 to adjust the direction of the cable 153 such that the position shift of the retractable probe member 151 can be converted into the rotation amount of the encoding disc 152A. In the embodiment of FIG. 1B, the probe 151A of the retractable probe member 151 is moved in the vertical direction. Alternatively, the probe 151A may be swung like as a swing arm as long as the swing amount of the probe 151A can be converted into the rotation amount of the encoding disc 152A so to calculate the thickness of the article 2.

Figure 2:
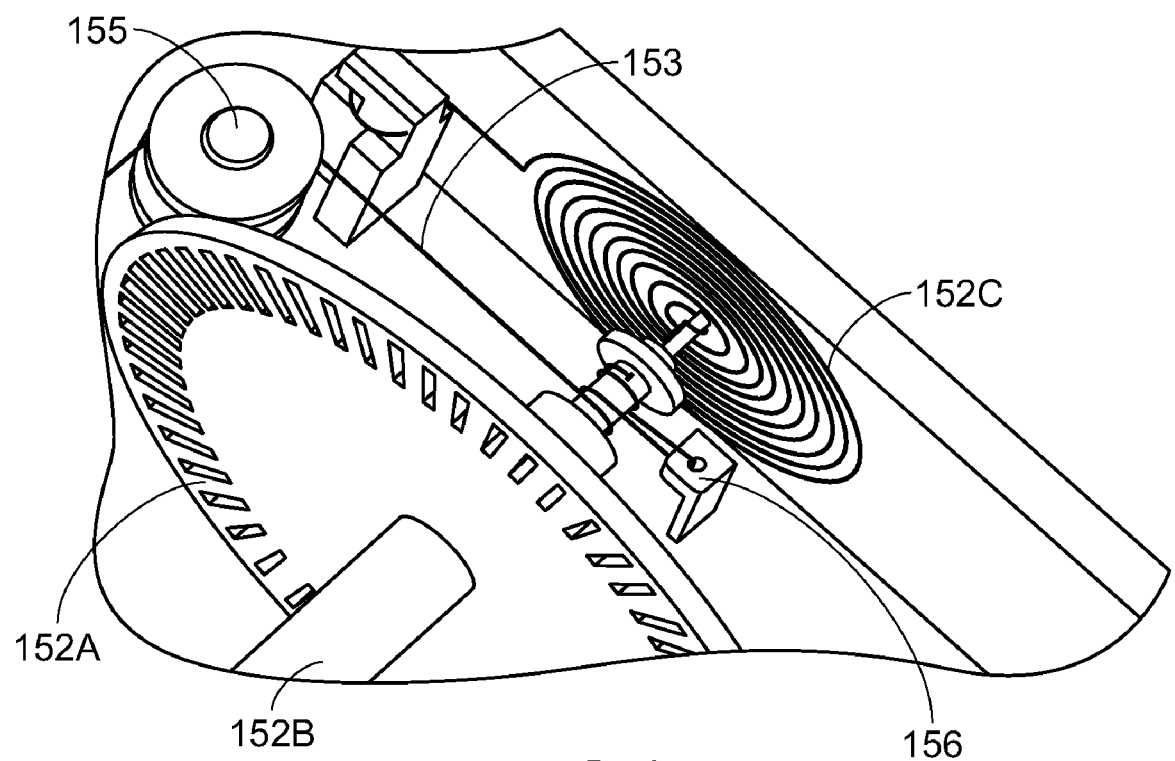
FIG. 2 is a schematic partial perspective view illustrating the internal portion of the laminating apparatus.

FIG. 2 is a schematic partial perspective view illustrating the internal portion of the laminating apparatus. Please refer to FIGS. 1A, 1B and 2. In the thickness detecting mechanism 15, the elastic element 152C (e.g. a coil spring), which is connected to the rotating shaft 152B, can maintain sufficient tension of the cable 153. In addition, the elastic element 152C may facilitate returning the rotating shaft 152B and the encoding disc 152A to their original positions. For preventing shifting or deviation of the cable 153 that is wound around the rotating shaft 152B, the thickness detecting mechanism 15 may optionally includes a fastening element 156 such as a hook, a post or a perforated structure. In this embodiment as shown in FIG. 2, the fastening element 156 is a perforated structure. The cable 153 is firstly wound around the rotating shaft 152B, then wound around the fastening element 156 and finally fixed on the rotating shaft 152B.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A laminating apparatus for laminating an article, said laminating apparatus comprising:

an entrance channel; and a thickness detecting mechanism for detecting a thickness of said article entering said entrance channel, and comprising:

a retractable probe member partially embedded into said entrance channel, wherein a position shift is resulted from said thickness of said article when said retractable probe member is pressed by said article;

a retractable encoding disc member comprising an encoding disc, a rotating shaft and an elastic element, wherein said rotating shaft is connected to said encoding disc and aligned with a center rotating axle line of said encoding disc, and said elastic element is connected to one end of said rotating shaft, wherein said elastic element is a coil spring connected to said rotating shaft, an elastic energy is stored in said coil spring when said rotating shaft is rotated in a first direction, and said rotating shaft is driven to rotate in a second direction opposite to said first direction when said elastic energy is converted into a kinetic energy;

a cable connected to said retractable probe member and fixed on and wound around said rotating shaft, wherein said position shift of said retractable probe member displaces said cable causing said rotating shaft to rotate which renders rotation of said retractable encoding disc member; and a sensing element disposed beside said encoding disc for detecting a rotation amount of said encoding disc, wherein said thickness of said article is calculated according to said rotation amount detected by said sensing element.

2. The laminating apparatus according to claim 1 wherein said coil spring connected to said rotating shaft maintains sufficient tension of said cable.

3. The laminating apparatus according to claim 1 further comprises a pulley between said retractable probe member and said rotating shaft for changing the direction of said cable.

4. The laminating apparatus according to claim 1 wherein said sensing element is a photo interrupter.

5. The laminating apparatus according to claim 1 wherein said retractable probe member comprises a probe and a spring, an elastic energy is stored in said spring when said probe is pressed by said article and moved in a first direction, and said elastic energy in said spring is converted into a kinetic energy to drive movement of said probe in a second direction opposite to said first direction after said article is transported across said probe.

6. The laminating apparatus according to claim 1 further comprises a fastening element, and said cable is firstly wound around said rotating shaft, then wound around the fastening element and finally fixed on said rotating shaft.

* * * * *